United States Patent [19]

Rahav et al.

[11] 4,089,217

[45] May 16, 1978

[54] GUIDED-BEAM TRANSDUCERS

[75] Inventors: Amir Rahav; Mathy Raz, both of Ramat Hasharon, Israel

[73] Assignee: Tedea Technological Development and Automation Ltd., Tel Aviv, Israel

[21] Appl. No.: 724,009

[22] Filed: Sep. 16, 1976

[51] Int. Cl.[2] .............................................. G01L 1/22
[52] U.S. Cl. ..................................... 73/141 A; 338/5
[58] Field of Search .......................... 73/141 A; 338/5; 177/211

[56] References Cited

U.S. PATENT DOCUMENTS

| 2,957,350 | 10/1960 | Kolb | 73/141 A X |
| 3,004,231 | 10/1961 | Laimins | 73/141 A X |
| 3,439,761 | 4/1969 | Laimins | 73/141 A X |
| 3,969,935 | 7/1976 | Shoberg | 73/141 A |

FOREIGN PATENT DOCUMENTS

| 2,129,214 | 1/1973 | Germany | 338/5 |
| 1,300,118 | 12/1972 | United Kingdom | 338/2 |

*Primary Examiner*—Charles A. Ruehl
*Attorney, Agent, or Firm*—Benjamin J. Barish

[57] ABSTRACT

Described is a dual guided-beam transducer provided with constant-strain characteristics by forming the two end sections of each beam with opposed edges that converge towards each other along straight lines crossing at the center of the beam, the strain gages being bonded to the end sections within their opposed converging edges.

Two embodiments of the invention are described. One embodiment includes a body mountable to a fixed support in cantilever fashion with the load applied normal to the axis of the support. A second described embodiment is a folded-end transducer of cylindrical shape for accommodating loads applied axially to the cylinder.

10 Claims, 9 Drawing Figures

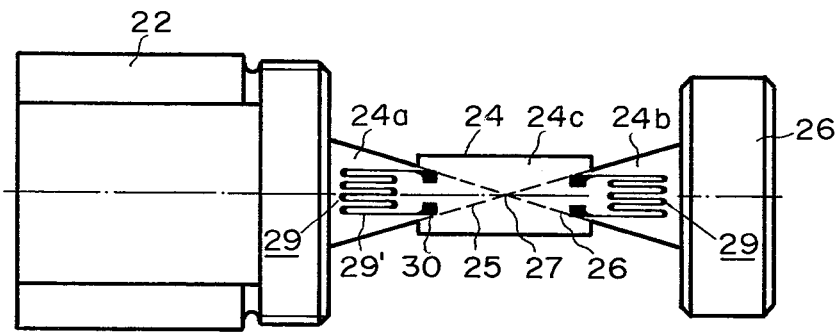
FIG. 2b
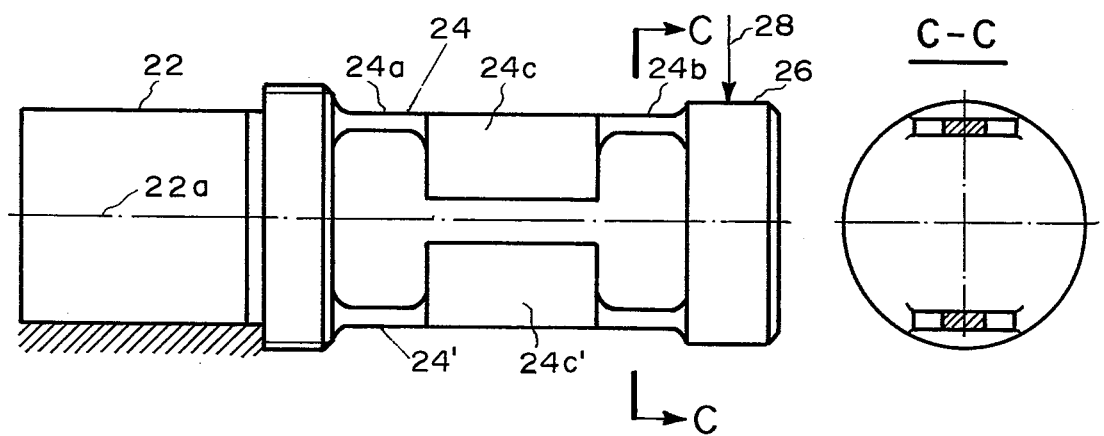
FIG. 2a
FIG. 2c

GUIDED-BEAM TRANSDUCERS

BACKGROUND OF THE INVENTION

The present invention relates to guided-beam transducers such as are used in strain-gage type load cells. The invention is particularly useful for producing constant-strain, dual guided-beam transducers, and is therefore described below with respect to that application.

Transducers having constant-strain characteristics generally provide improved linearity and sensitivity, particularly creep properties, i.e., change in output as a function of time with constant load applied. Heretofore, single, non-guided beam transducers have been used to provide constant-strain characteristics. Single-beam transducers, however, generally perform more poorly than guided-beam transducers with respect to linearity and repeatability of output, hysteresis, criticality of the point of load application, and immunity from side loads and moments. A number of techniques have been proposed for imparting constant-strain characteristics to dual guided-beam transducers, but the constant-strain characteristics provided by such known techniques are merely approximations and not exact.

An object of the present invention is to provide a guided-beam transducer having constant-strain characteristics which are theoretically exact.

Another object of the present invention is to provide a novel dual guided-beam transducer of the folded-end type.

SUMMARY OF THE INVENTION

According to one aspect of the present invention, there is provided a guided-beam transducer comprising a beam having one end section fixed to the transducer body, an opposite end section adapted to receive a load normal to the beam and acting to deflect same, and an intermediate section joining together the two end sections, each of the two end sections being formed with opposed edges that converge towards each other along straight lines crossing at the centre of the beam. The strain gages are bonded to the beam end sections within their converging edges.

Theoretically, the means for guiding the deflection of the beam could be flexors, sliding surfaces, or other known arrangements. Particularly advantageous results have been produced, however, when the invention is used with respect to dual guided-beam transducers wherein the guiding means comprises a second beam of the same structure as the first-mentioned beam and fixed at its opposite ends in spaced parallel relationship to the first-mentioned beam.

Two embodiments of the invention are described below for purposes of example. In one embodiment, the transducer body includes a mounting section mountable to a support in cantilever fashion with the pair of beams disposed parallel to the axis of the mounting section for receiving a load applied normal to that axis. In the second described embodiment, the transducer is of a novel folded-end construction for receiving loads applied parallel to the axis of the transducer body.

Further features and advantages of the invention will be apparent from the description below.

BRIEF DESCRIPTION OF THE DRAWINGS

The invention will now be described, for purposes of example only, with reference to the accompanying drawings, wherein:

FIGS. 2a, 2b, 2c are side elevational, plan, and sectional views, respectively, of one form of constant-strain, dual guided-beam transducer constructed in accordance with the invention.

DESCRIPTION OF THE PREFERRED EMBODIMENTS

Before proceeding with a description of the two illustrated preferred embodiments of the invention, it would be helpful first to refer to the diagrams of FIGS. 1a–1d.

Figure 1A:
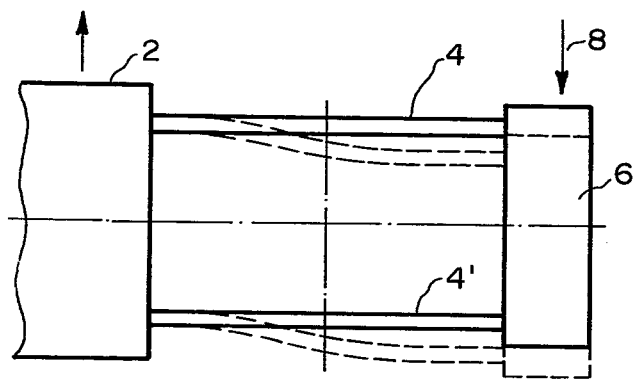
FIGS. 1a–1d are diagrams helpful in understanding the invention.
Figure 1B:
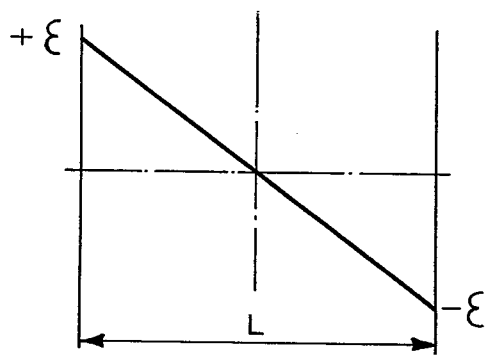

FIG. 1a schematically illustrates a conventional dual guided-beam transducer including a body 2 and a pair of parallel, spaced beams 4, 4' attached at one end to the transducer body 2 and at their opposite ends to a common member 6 adapted to receive a load 8 normal to the beams. In such conventional transducers, the beams are of constant cross-section; FIG. 1b illustrates the strain-length relationship of such a transducer, wherein it will be seen that the strain is not constant but increases linearly with the length of the beam.

Figure 1C:
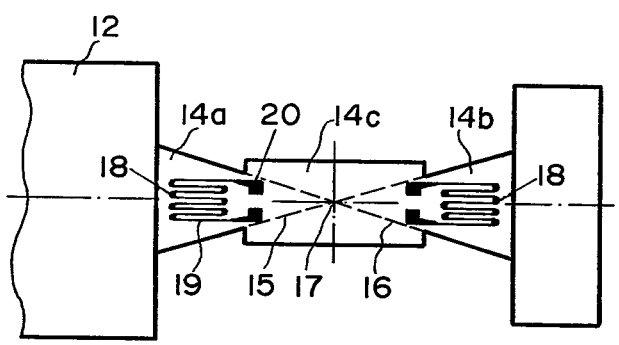
Figure 1D:
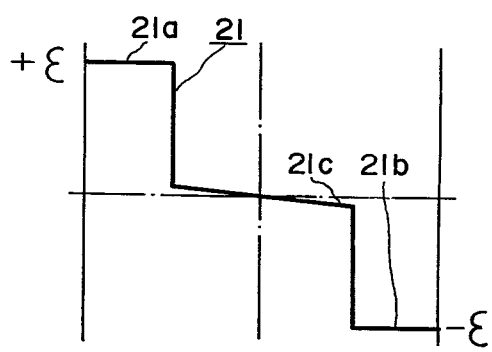

FIG. 1c illustrates, in plan view, how the beams of the dual guided-beam transducer of FIG. 1a may be configured in accordance with the present invention to provide a constant-strain characteristic, and FIG. 1d illustrates the strain-length relationship of the transducer when its beam is so configured.

More particularly, the constant-strain characteristic illustrated in FIG. 1d is obtainable by forming each of the beams, generally designated 14, with three distinct sections as illustrated in FIG. 1c, namely end sections 14a, 14b, and intermediate section 14c. End section 14a is secured to the transducer body 12, and end section 14b is adapted to receive the load normal to the beam acting to deflect same. Both end sections are formed with opposed edges that converge towards each other along straight lines 15, 16, crossing at the centre 17 of the beam. Each of the beams 14 includes a strain gage 18 bonded to each of the two end sections 14a, 14b, with the effective length 19 of the strain gage disposed within the converging sides of the end section, and the tabs 20 disposed within the intermediate section 14c.

FIG. 1d illustrates the strain-length curve 21 exhibited by a guided-beam transducer constructed as illustrated in FIG. 1c, wherein it will be seen that a constant-strain relationship is present at portions 21a, 21b of the curve, corresponding to end section 14a, 14b of the transducer beam, and a linearly-varying relationship is present at portion 21c, corresponding to the intermediate section 14c of the beam. Since the effective lengths 19 of the strain gages 18 occupy only the end sections 14a, 14b of the beam, and since the strain is constant along the length of the end sections, there will be no strain gradient along the strain gages.

FIGS. 2a–2c illustrate one form of dual guided-beam transducer constructed in accordance with the invention to have a constant-strain characteristic.

The transducer of FIGS. 2a–2c includes a substantially cylindrical mounting section 22 having a pair of beams 24, 24' secured at one end to section 22, the opposite ends of the beams being secured together by a load-engaging member 26 adapted to receive the load normal to the beams, as shown by arrow 28. FIG. 2b illustrates, in plan view, the configuration of each of the beams 24, 24', which configuration corresponds to that in FIG. 1c. Thus, with reference to beam 24 illustrated in FIG. 2b, the beam includes a pair of end sections 24a, 24b, (and 24a', 24b' for beam 24') having outer edges that converge towards each other along straight lines 25, 26, that cross at the centre 27 of the beam, which is also the centre of the intermediate section 24c joining together the two end sections 24a, 24b. As in FIG. 1c, a strain gage 29 is bonded to each of the end sections 24a, 24b, the effective length 29' of each strain gage being disposed between the converging edges of the respective end section, and the tabs 30 of each strain gage being bonded to the intermediate section 24c. Thus, when a load is applied to the load-engaging member 26 of the transducer, the two beams will exhibit the strain-length relationship illustrated by curve 21 in FIG. 1d, with each strain gage 29 having a constant-strain relationship at portions 21a, 21b, of the curve.

The configuration and dimensions of the intermediate sections 24c, 24c' of the beams are not critical as they affect only the intermediate portion 21c of the curve 21 in FIG. 1d, and not the constant-strain portions 21a, 21b of that curve. Preferably, however, the intermediate sections of the two beams 24c, 24c' are of greater width than the width at the inner end of each of the end sections (as shown in FIG. 2b), and also are of greater thickness than the two end sections (as shown in FIG. 2a).

Figure 3A:
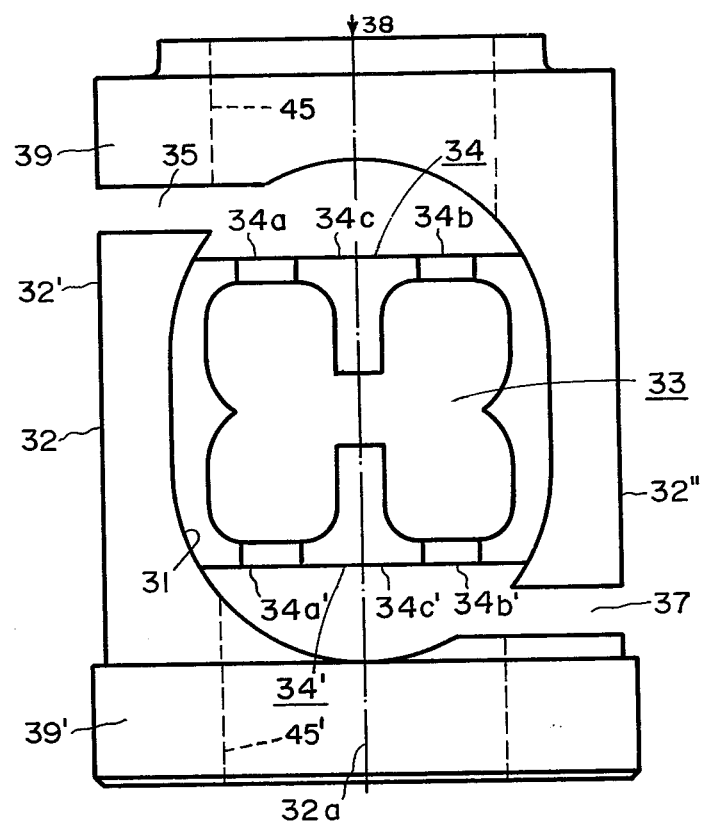
FIGS. 3a and 3b are end elevational and plan views, respectively, of a second form of constant-strain, dual guided-beam transducer constructed in accordance with the invention.
Figure 3B:
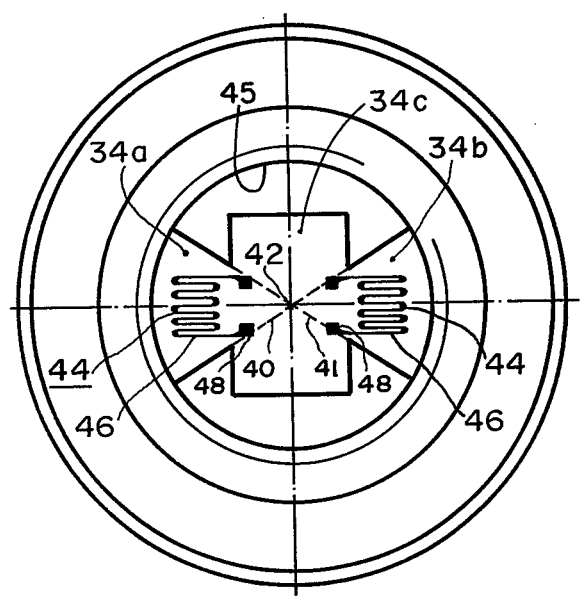

FIGS. 3a, 3b illustrate a folded-end type of dual guided-beam transducer constructed in accordance with the invention to have constant-strain characteristics.

The transducer body 32 of FIGS. 3a, 3b is of substantially cylindrical shape. It is formed with an oval recess 31 partly through its opposed sides, and with a smaller transverse bore 33 of substantial figure-8 configuration through the recess. Body 32 further includes a first slit 35 extending through one nonrecessed side 32' of the body at right angles to its longitudinal axis 32a, intersecting one end of recess 31 and spaced from one end of the transverse bore 33, slit 35 terminating short of the opposite side of the body 32". The body is formed with a second slit 37 through the opposite side 32" parallel to slit 35, the second slit 37 intersecting the opposite end of recess 31 and spaced from the opposite end of transverse bore 33, and terminating short of side 32' of the body. Recess 31, bore 33, and slits 35, 37 are configured, as particularly shown in FIG. 3a, to define two parallel beams 34, 34", integrally secured to the sides 32', 32" of the body, the two beams being normal to the longitudinal axis 32a of the body and having folded ends 39, 39' for receiving a load applied parallel to the axis 32 of the body. A strain gage 44 (FIG. 3b) is bonded to each of the two ends of the beams on the faces thereof facing their respective slit 35 or 37. Further, an axial bore 40, 40' is formed through each of the folded ends 39, 39', concentric with the longitudinal axis 32a of the body, each of the axial bores terminating at the slit 35, 37 at the respective end of the body. As shown particularly in FIG. 3b, the axial bores 45, 45' are of a diameter to expose therethrough substantially the complete span of the respective beam 34, 34', as well as the strain gages (44, FIG. 3b) bonded thereto.

To provide a constant-strain characteristic to the transducer, each of the beams 34, 34' is formed with variable cross-section configuration described above with respect to FIG. 1c and 2a-2c. Thus, as shown in FIG. 3b, each beam 34, 34' includes the two end sections 34a, 34b whose outer edges converge towards each other along straight lines 45, 45' that cross at centre 42 of the intermediate section 34c, which is also the centre of the beam. The strain gages 44 are bonded to the beams such that the effective length 46 of each gage is disposed within the converging edges of the respective end section 34a, 34b of the beam, with the tabs 48 of the strain gage disposed within the intermediate section 34c. Further, as in FIGS. 2a-2c, the intermediate section (e.g. 34c) of the two beams 34, 34' is of greater width than the width at the inner end of each of the end sections (as shown in FIG. 3b), and is also of greater thickness for most of its length than the end sections (as shown in FIG. 3a).

It will thus be seen that in the transducer of FIGS. 3a, 3b, a load applied along the axis 32a of the transducer body 32, as shown by arrow 38, will be transmitted at a right angle to the two beams 34, 34', producing a strain on the beams which is measured by the strain gages 44 bonded to the beams. By providing the end sections 34a, 34b of the two beams with the converging outer edges within which the effective lengths of the strain gages are bonded, as described above, there will be no strain gradient along the strain-gages. Further, the specific arrangement described not only gages all the force paths by the use of only four strain gages, but also greatly facilitates the application and bonding of the strain gages to their respective beams (via axial bores 45, 45'), and thereby substantially simplifies the manufacture of the transducer.

While the invention has been described particularly with respect to two preferred embodiments, it will be appreciated that many variations, modifications and applications of the invention may be made.

What is claimed is:

1. A guided-beam transducer, comprising: a transducer body; a beam having one end section fixed to said body, an opposite end section adapted to receive a load normal to the beam acting to deflect same, and an intermediate section joining together said two end sections; each of said two end sections being formed with opposed edges that converge towards each other along straight lines crossing at the centre of the beam; means for guiding the deflection of said beam; and a strain gage bonded to each of said two end sections within the opposed converging edges thereof.

2. A transducer according to claim 1, wherein said means for guiding the deflection of the beam comprises a second beam of the same structure as the first-mentioned beam and fixed at its opposite ends in spaced parallel relationship to the first-mentioned beam.

3. A transducer according to claim 2, wherein the transducer body includes a mounting section mountable to a support in cantilever fashion with the pair of beams disposed parallel to the axis of the mounting section for receiving a load applied normal to said axis.

4. A transducer according to claim 2, wherein the transducer body includes a mounting section mountable to a support with the pair of beams disposed normal to the axis of the mounting section and with the ends of the transducer body being folded for receiving loads applied parallel to the axis of the mounting section.

5. A transducer according to claim 2, wherein the transducer body is formed with a bore extending transversely therethrough; a first slit extending through one side of the body at right angles to the longitudinal axis thereof spaced from one end of said bore and terminating short of the opposite side of the body; a second slit extending through the opposite side of the body parallel to said first slit, said second slit being spaced from the opposite end of said bore and terminating short of said one side of the body; said bore and slits being configured to define said parallel beams, which beams are integral with said sides of the body normal to the longitudinal axis of the body, with the body having folded ends for receiving loads applied parallel to the longitudinal axis of the body; there being a strain gage bonded to each of the two end sections of each of said beams on the faces thereof facing said slits; an axial bore being formed through each of said folded ends concentric with said longitudinal axis of the body, said axial bores terminating at the respective end of the body and being of a diameter to expose therethrough substantially the complete span of the respective beam and the strain gages bonded thereto.

6. A transducer according to claim 1, wherein the intermediate section of said beam is of greater width than the width at the inner end of each of said end sections, and is of greater thickness than that of said end sections.

7. A transducer according to claim 1, wherein each of said strain gages comprises an active length bonded to its respective end section within the opposed converging edges thereof, and a pair of tabs each electrically connected to one end of the active length of the strain gage and bonded to said intermediate section.

8. A guided beam transducer, comprising: a transducer body formed with a bore extending transversely therethrough; a first slit extending through one side of the body at right angles to the longitudinal axis thereof spaced from one end of said bore and terminating short of the opposite side of the body; a second slit extending through the opposite side of the body parallel to said first slit, said second slit being spaced from the opposite end of said bore and terminating short of said one side of the body; said bore and slits being configured to define a pair of spaced parallel beams formed integrally with said sides of the body normal to the longitudinal axis of the body with the body having folded ends for receiving loads applied parallel to the longitudinal axis of the body; and a strain gage bonded to the ends of each of said beams on the faces thereof facing said slits; an axial bore being formed through each of said folded ends concentric with said longitudinal axis of the body, said axial bores terminating at the slit at the respective end of the body and being of a diameter to expose therethrough substantially the complete span of the respective beam and the strain gages bonded thereto.

9. A transducer according to claim 8, wherein the ends of each of said two beams to which the strain gages are bonded are each formed with opposed edges that converge towards each other along straight lines crossing at the centre of the respective beam, said strain gages being bonded to the ends of the beams within their opposed converging edges.

10. A transducer according to claim 8, wherein said transducer body is substantially of cylindrical shape, and said transverse bore is of substantially figure-8 shape.

* * * * *